(12) United States Patent
Geisler

(10) Patent No.: US 7,830,335 B1
(45) Date of Patent: Nov. 9, 2010

(54) METHOD FOR REPRESENTING MOVING OBJECTS IN BITMAP FORMAT ON A MATRIXED DISPLAY DEVICE

(75) Inventor: Thomas Geisler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 1826 days.

(21) Appl. No.: 09/673,313

(22) PCT Filed: Feb. 23, 1999

(86) PCT No.: PCT/DE99/00481

§ 371 (c)(1),
(2), (4) Date: Nov. 24, 2000

(87) PCT Pub. No.: WO99/54850

PCT Pub. Date: Oct. 28, 1999

(30) Foreign Application Priority Data

Apr. 16, 1998 (DE) ................. 198 16 795

(51) Int. Cl.
*G09G 5/30* (2006.01)
(52) U.S. Cl. ................. 345/9; 345/7; 345/442; 345/638
(58) Field of Classification Search ........... 345/629, 345/639, 619, 440.1, 772, 852, 7, 9, 442, 345/638; 315/120, 129; 313/10
See application file for complete search history.

(56) References Cited

U.S. PATENT DOCUMENTS

| | | | | |
|---|---|---|---|---|
| 5,359,531 A | * | 10/1994 | Iwamoto et al. ............. | 700/146 |
| 5,408,603 A | * | 4/1995 | Van de Lavoir et al. ..... | 345/763 |
| 5,442,737 A | | 8/1995 | Smith | |
| 5,613,048 A | | 3/1997 | Williams et al. | |
| 5,796,411 A | * | 8/1998 | Cyman et al. ................ | 345/502 |
| 5,828,814 A | * | 10/1998 | Cyman et al. ................ | 358/1.2 |
| 5,892,507 A | * | 4/1999 | Moorby et al. ........... | 715/500.1 |

FOREIGN PATENT DOCUMENTS

| | | |
|---|---|---|
| DE | 297 03 902 U | 6/1997 |
| EP | 0 671 892 A | 9/1995 |
| EP | 0 821 321 A | 1/1998 |
| FR | 2 727 543 A | 5/1996 |
| WO | 98 06069 A | 2/1998 |

OTHER PUBLICATIONS

Patent Abstract of Japan vol. 099, No. 004, Apr. 30, 1999 & JP 11 020507 A, Jan. 26, 1999.

* cited by examiner

*Primary Examiner*—Javid A Amini
(74) *Attorney, Agent, or Firm*—Michael J. Striker

(57) ABSTRACT

The invention creates a method for representing moving objects in bit-mapped format on a matrixlike display device, having the following steps: calculation of a plurality of bit maps for a certain number of a various object representations along a predetermined path curve in advance; storage of the plurality of bit maps in memory in advance; and execution of a representation processing with a display sequence of object representations along the path curve by reading and displaying correspondingly memorized bit maps.

13 Claims, 1 Drawing Sheet

$B(i) =$

| 255 | 239 | 176 | 176 | 239 | 255 |
|---|---|---|---|---|---|
| 255 | 176 | 0 | 0 | 176 | 255 |
| - - | - - | 0 | 0 | - - | - - |
| - - | - - | 0 | 0 | - - | - - |
| - - | - - | 0 | 0 | - - | - - |
| - - | - - | 0 | 0 | - - | - - |

Fig. 1a $Z(i,a) =$

| 255 | 247 | 197 | 135 | 167 | 236 |
|---|---|---|---|---|---|
| 255 | 216 | 57 | 0 | 88 | 213 |
| - - | - - | - - | 0 | - - | - - |
| - - | - - | - - | 0 | - - | - - |
| - - | - - | - - | 0 | 0 | - - |
| - - | - - | - - | 0 | 0 | - - |

Fig. 1b $B(i+1) =$

| 255 | 255 | 217 | 94 | 94 | 217 |
|---|---|---|---|---|---|
| 255 | 255 | 113 | 0 | 0 | 170 |
| - - | - - | - - | 0 | 0 | - - |
| - - | - - | - - | 0 | 0 | - - |
| - - | - - | - - | 0 | 0 | - - |
| - - | - - | - - | 0 | 0 | - - |

Fig. 1c

METHOD FOR REPRESENTING MOVING OBJECTS IN BITMAP FORMAT ON A MATRIXED DISPLAY DEVICE

PRIOR ART

The present invention relates to a method for representing moving objects in bit-mapped format on a matrix-like display device.

Although it can be employed on arbitrary objects in bit-mapped format and arbitrary matrixlike display devices, the present invention and the problems fundamental to it will be explained below with regard to a dashboard display device, or monitor, located on board a motor vehicle, for representing a pointer.

For a fluid or sliding representation, that is, a representation of pointer animation without perceptible skipping on a dashboard monitor on board a motor vehicle, it is generally necessary to go to considerable computation effort, which requires the use of dedicated graphics hardware and software.

The following operations must typically be performed.

The pointer, for instance the speedometer pointer, which is present in the form of a bit map, must be rotated by computation into angular positions corresponding to various speeds.

In this bit map, the pointer has much higher resolution (supersampling) than in the case of the actual representation on the display device, so that then, in other words after the computational rotation, a filtration in the local region for the sake of edge smoothing (anti-aliasing) can be appropriately performed. Typically, one ray of 3×3=9 pixels in the bit map corresponds to a single pixel of the display device. Each pixel can assume 256 bit values for each individual one of the three fundamental colors, red, green and blue.

Furthermore, a computational superposition of the pointer, in each of its angular positions, with a suitable background image such as a scale is necessary.

The problems fundamental to the present invention are in general that this computation effort in representing objects in bit-mapped format on a matrixlike display device using conventional hardware with a structure similar to a personal computer, cannot be accomplished fast enough. As a result, the object to be represented moves along the predetermined path curve slowly and in visible stages, which makes the observer uneasy.

In the prior art, anti-aliasing processing with hardware or software can be executed sufficiently fast only in the case of edge smoothing of objects present in vector data form, such as a line or a circle, or in the representation of filler patterns, which represent the repetition of a relatively small-area basic pattern.

However, the only sensible way to represent pointers, including their hubs, with arbitrary color patterns and shapes, as is desired by customers and designers, is in the form of a bit map.

ADVANTAGES OF THE INVENTION

The method according to the invention for representing objects in bit-mapped format on a matrixlike display device in accordance with claim 1 has the advantage that it reduces the online computation effort for representing objects in bit-mapped format on a matrixlike display device considerably and thus makes a flowing representation without skipping possible on conventional hardware. Arbitrary graphical objects of high quality can be utilized for animation purposes. All of these objects can be stored in the general form of a bit map and need not be described inconveniently in vector form.

The concept on which the present invention is based is that the time-consuming calculations can be performed in advance offline for a certain number of different object representations along a corresponding path curve. The object representations, which are thus present in preprocessed positions at discrete locations, are each stored as a respective bit map. During the running time of the representation program, only the bit map that is to be displayed for situational reasons is read out of the memory and displayed. Expediently, this bit map is superimposed on the also preprocessed and stored background image.

Advantageous refinements and improvements to the method defined by claim 1 are found in the dependent claims.

In accordance with a preferred refinement, in the calculation of the plurality of bit maps in advance, a filtration is performed for the sake of edge smoothing in the local region. This has the advantage that even this time-consuming calculation operation can be performed offline.

In a further preferred refinement, an associated precalculated and pre-stored background image is superimposed on the various object representations. This is expedient, since the background image changes substantially more seldom than the foreground image that includes the object moving along the path curve.

In a further preferred refinement, the spatial difference between adjacent object representations along the path curve, which are precalculated and pre-stored as a respective bit map, is substantially smaller than the applicable object representations. In other words, an appropriate correlation between two adjacent object representations along the path curve must prevail, if appropriate results are to be attained. A contrary example would be two pointer positions, one indicating "12 o'clock" and the other "3 o'clock".

In another preferred refinement, for displaying object representations which are located between two object representations having a respective pre-calculated and pre-stored bit map, a paired interpolation between the corresponding pixel values (picture elements) is performed. By means of this kind of interpolation process, the object path resolution can be made arbitrarily fine. Furthermore, this saves space in memory, which is needed for the precalculated bit maps.

In a further preferred refinement, the pixel values are present separately in accordance with certain colors, preferably the three fundamental colors of red, green and blue, and the interpolation is performed separately for each color.

In a further preferred refinement, for the interpolation, the mean value for each pixel, weighted in accordance with the intermediate position, is calculated. This corresponds to a simple linear interpolation as a function of the position of the intermediate position.

In a further preferred refinement, a compression of the pre-stored bit map data is performed. This then leads to good results especially if large image areas with a single-color background are available.

DRAWINGS

Exemplary embodiments of the invention are shown in the drawings and described in further detail below.

Shown are:

FIG. 1a, a bit map B(i) for representing a pointer in bit-mapped format on a matrixlike display device of a dashboard instrument on an $i^{th}$ point of a path curve;

FIG. 1b, an intermediate bit map Z(i, a), interpolated linearly in online operation, for representing a pointer in bit-mapped format on a matrixlike display device of a dashboard instrument at an $(i+a)^{th}$ point of the path curve, where a=0.5; and FIG. 1c, a bit map B(i+1) for representing a pointer in bit-mapped format on a matrixlike display device of a dashboard instrument at an adjacent $(i+1)^{th}$ point of the path curve.

DESCRIPTION OF THE EXEMPLARY EMBODIMENTS

One embodiment of the method according to the invention for representing objects in bit-mapped format on a matrixlike display device will be described below with reference to FIGS. 1a-1c, in terms of its use for representing a pointer on a dashboard display device, or dashboard monitor, on board a motor vehicle.

First, a calculation of a plurality of bit maps for a certain number of different pointer representations along a predetermined path curve, namely along a circular scale, for instance, as a background is done offline. Already in these advance calculations of the plurality of bit maps, a filtration is performed for the sake of edge smoothing in the local region, so as to make the later online calculations as slight as possible and thus make the display speed as fast as possible.

The spatial difference between adjacent pointer representations along the path curve, which are precalculated and pre-stored as a respective bit map, is substantially smaller than the applicable pointer representations. The precise difference must be optimized from one case to another to suit the various pointer representations.

The calculated plurality of bit maps is stored in memory in advance in a memory device that is part of the dashboard monitor. In general, a compromise must be made between the available memory space and the desired fine resolution.

In online operation, during motor vehicle travel, the execution of a representation processing is then done, with a display sequence of pointer representations along the path curve, by reading and displaying suitably stored bit maps. If the pointer is the speedometer pointer, it is accordingly the pointer bit map corresponding to the instantaneous speed that is read and displayed at a given time.

The corresponding scale, which is an associated precalculated and pre-stored background image, has the pointer representation superimposed on it.

Let it be assumed as an example that in FIG. 1a a bit map B(i) for representing the pointer in bit-mapped format on the matrixlike display device of the dashboard instrument is shown at an $i^{th}$ point of the path curve, specifically to indicate 120 km/h.

Let it also be assumed that in FIG. 1b, a bit map B(i+1) for representing the pointer in bit-mapped format on the matrixlike display device of the dashboard instrument is shown at an adjacent $(i+1)^{th}$ point of the path curve, specifically to indicate 125 km/h.

A bit map for representing a pointer in bit-mapped format on the matrixlike display device of the dashboard instrument at an intervening point of the path curve, specifically to indicate 122.5 km/h, is not stored in memory.

In this embodiment of the invention, a display of such a pointer representation located between two pointer representations each with a precalculated and pre-stored bit map, is done by means of a paired interpolation between the corresponding pixel values. The pixel values are present separately in accordance with certain colors, preferably the three fundamental colors of red, green and blue, and preferably the interpolation is performed separately for each color.

In this example, however, for the sake of simplicity let it be assumed that the pointer representation is done in only one fundamental color each, or that the values for all three fundamental colors are the same. The resultant 256 values are located between 0 and 255. 0 designates the darkest value and 255 the brightest value. It should also be noted that for the sake of simplicity, not all the pixel values are shown in the bit maps of FIGS. 1a-1c.

FIG. 1b is an intermediate bit map Z(i, a) interpolated linearly in online operation, for representing the pointer in bit-mapped format on the matrixlike display device of the dashboard instrument at an $(i+a)^{th}$ point of the path curve; in this case, a=0.5, because 122.5 km/h is located precisely in the middle between 120 km/h and 125 km/h.

The pixel values $Z_{mn}(i, a)$ of the intermediate bit map Z(i, a) can accordingly be calculated as followed:

$$Z_{mn}(i,a)=(1-a)*B_{mn}(i)+a*B_{mn}(i+1) \qquad (1)$$

where m is the line indicator and n is the column indicator. In other words, the pixel values $Z_{mn}(i, a)$ are precisely the mean values of the pixel values $B_{mn}(i)$ and $B_{mn}(i+1)$.

Although the present invention has been described above in terms of a preferred exemplary embodiment, it is not limited to that but instead can be modified in manifold ways.

In particular, it is understood that instead of the above linear interpolation, any other interpolation is possible.

Nor is the interpolation absolutely necessary; it depends on the memory capacity and on the desired fine resolution. For example, it is not necessary to perform an interpolation below a certain threshold difference, which in the above example can be 1 km/h.

To save storage space, a compression/decompression of the pre-stored bit map data, that is, pointer data and/or background data, can be employed.

The invention claimed is:

1. A method for representing an object in bit-mapped format on a matrix like display device, having the following steps:

calculating a plurality of bit maps for a certain number of various object representations along a predetermined path curve in advance;

storing the plurality of bit maps in memory in advance; and executing a representation processing with a display sequence of object representations along the path curve by reading and displaying correspondingly memorized bit maps, wherein the object moves along the path curve during the representation processing and displaying of the correspondingly memorized bit maps.

2. The method of claim 1, characterized in that the calculating of the plurality of bit maps in advance, a filtration is performed for the sake of edge smoothing in the local region.

3. The method of claim 1, characterized in that an associated precalculated and pre-stored background image has the various object representations superimposed on it.

4. The method of claim 1, characterized in that the spatial difference between adjacent object representations along the path curve, which are precalculated and pre-stored as a respective bit map, is substantially smaller than the applicable object representations.

5. The method of claim 1, characterized in that for displaying object representations, which are located between two object representations having a respective precalculated and pre-stored bit map, a paired interpolation between the corresponding pixel values is performed.

6. The method of claim 5, characterized in that the pixel values are present separately in accordance with certain colors, preferably the three fundamental colors of red, green, blue, and the interpolation is performed separately for each color.

7. The method of claim 6, characterized in that for the interpolation, the mean value for each pixel, weighted in accordance with the intermediate position, is calculated.

8. The method of claim 1, characterized in that a compression of the pre-stored bit map data is performed.

9. The method of claim 1, characterized in that the method is employed on a dashboard display device, located on board a motor vehicle, for representing a pointer.

10. The method of claim 9, wherein the pointer is a speedometer pointer, and wherein a pointer bitmap corresponding to a speed is read and displayed at a given time.

11. The method of claim 9, wherein an associated pre-calculated and pre-stored background image is a corresponding speed scale.

12. The method of claim 1, wherein the various object representations are object representations of the same object.

13. The method of claim 1, wherein the object is a pointer and wherein the pointer moves along a scale, wherein in different position of the pointer, graphical representations are calculated and stored in advance.

* * * * *